United States Patent
Ahn et al.

(10) Patent No.: US 11,002,287 B2
(45) Date of Patent: May 11, 2021

(54) TURBO COMPRESSOR HAVING AN INNER PASSAGE FOR COOLING THE MOTOR

(71) Applicant: LG Electronics Inc., Seoul (KR)

(72) Inventors: Sungyong Ahn, Seoul (KR); Seheon Choi, Seoul (KR)

(73) Assignee: LG Electronics Inc., Seoul (KR)

( * ) Notice: Subject to any disclaimer, the term of this patent is extended or adjusted under 35 U.S.C. 154(b) by 251 days.

(21) Appl. No.: 15/971,354

(22) Filed: May 4, 2018

(65) Prior Publication Data

US 2018/0328634 A1 Nov. 15, 2018

(30) Foreign Application Priority Data

May 11, 2017 (KR) .................. 10-2017-0058850

(51) Int. Cl.
*F04D 29/44* (2006.01)
*F04D 29/58* (2006.01)
(Continued)

(52) U.S. Cl.
CPC ......... *F04D 29/441* (2013.01); *F04D 29/403* (2013.01); *F04D 29/582* (2013.01); *F04D 29/5806* (2013.01); *F04D 29/601* (2013.01); *F25B 31/006* (2013.01); *F04D 17/08* (2013.01); *F04D 25/06* (2013.01); *F04D 25/062* (2013.01);
(Continued)

(58) Field of Classification Search
CPC ...... F04D 19/00; F04D 29/52; F04D 29/0513; F04D 1/04; F04D 5/007; F04D 5/008; F04D 13/025; F04D 13/0626; F04D 17/06; F25B 2400/07
See application file for complete search history.

(56) References Cited

U.S. PATENT DOCUMENTS 5,555,956 A * 9/1996 Voss ................... F04D 25/06
184/104.1
6,129,524 A * 10/2000 Woollenweber ........ F04D 17/12
417/366
(Continued)

FOREIGN PATENT DOCUMENTS

| DE | 102014215560 | 1/2016 |
|---|---|---|
| EP | 2258948 | 12/2010 |
| EP | 3141757 | 3/2017 |

OTHER PUBLICATIONS

European Search Report in European Application No. 18167979.6, dated Sep. 24, 2018, 8 pages.

*Primary Examiner* — Bryan M Lettman
*Assistant Examiner* — Timothy P Solak
(74) *Attorney, Agent, or Firm* — Fish & Richardson P.C.

(57) ABSTRACT

A turbo compressor includes a driving unit including a stator and a rotor that are configured to generate a rotational force and a rotary shaft that is connected to and rotated by the rotor, an impeller connected to the rotary shaft to pressurize a suction refrigerant in the radial direction of the rotary shaft and a casing that receives the driving unit and the impeller and supports the rotary shaft. The casing includes a first shell to which the stator is fixed and that rotatably supports the rotary shaft, and a second shell that is spaced apart from the first shell and surrounds the first shell. A shell passage is defined between the first and second shells. The discharged refrigerant cools the driving unit, which improves the efficiency of the compressor.

18 Claims, 4 Drawing Sheets

(51) Int. Cl.
*F04D 29/60* (2006.01)
*F04D 29/40* (2006.01)
*F25B 31/00* (2006.01)
*F04D 25/06* (2006.01)
*F04D 29/051* (2006.01)
*F04D 29/057* (2006.01)
*F25B 31/02* (2006.01)
*F04D 29/62* (2006.01)
*F04D 29/041* (2006.01)
*F04D 17/08* (2006.01)
*F04D 29/52* (2006.01)
*F25B 1/053* (2006.01)

(52) U.S. Cl.
CPC ...... *F04D 25/0606* (2013.01); *F04D 29/0413* (2013.01); *F04D 29/057* (2013.01); *F04D 29/0513* (2013.01); *F04D 29/52* (2013.01); *F04D 29/584* (2013.01); *F04D 29/624* (2013.01); *F25B 1/053* (2013.01); *F25B 31/026* (2013.01); *F25B 2400/07* (2013.01)

(56) References Cited

U.S. PATENT DOCUMENTS

| | | | |
|---|---|---|---|
| 7,757,502 B2 * | 7/2010 | Merritt | B64D 13/06 417/405 |
| 2004/0052645 A1 * | 3/2004 | Christensen | F04D 29/588 417/53 |
| 2013/0129488 A1 * | 5/2013 | Agrawal | F04D 29/057 415/170.1 |
| 2015/0267709 A1 * | 9/2015 | Hoshino | F04D 17/10 417/423.7 |
| 2016/0290362 A1 | 10/2016 | Iwano | |

* cited by examiner

TURBO COMPRESSOR HAVING AN INNER PASSAGE FOR COOLING THE MOTOR

CROSS-REFERENCE TO RELATED APPLICATION

Pursuant to 35 U.S.C. § 119(a), this application claims the benefit of earlier filing date and right of priority to Korean Application No. 10-2017-0058850, filed on May 11, 2017, the contents of which is incorporated by reference herein in its entirety.

BACKGROUND

1. Field

The present invention relates to a turbo compressor for compressing a refrigerant by rotating an impeller with a rotational force generated by a driving motor.

2. Description of the Conventional Art

Generally, compressors can be roughly classified into a positive displacement compressor and a turbo compressor. The positive displacement compressor uses a piston or vane, such as in a reciprocating or rotary type, to suck and compress a fluid, and then discharges the fluid. On the contrary, the turbo compressor uses a rotary element to suck and compress a fluid, and then discharges the fluid.

In order to obtain a desired discharge pressure, the positive displacement compressor properly adjusts a ratio of a suction volume to a discharge volume to determine a compression ratio. Therefore, the positive displacement compressor has a limitation in minimizing its overall size relative to the capacity.

The turbo compressor is similar to a turbo blower but has a higher discharge pressure and a smaller flow rate than the turbo blower. Such a turbo compressor increases a pressure of a fluid that flows continuously and is divided into an axial flow type, when the fluid flows in the axial direction, and a centrifugal type, when the fluid flows in the radial direction.

Unlike the positive displacement compressor such as a reciprocating compressor or a rotary compressor, the turbo compressor cannot easily obtain a desired high pressure ratio only by a single compression, due to various factors such as workability, mass productivity and durability, even when a rotating impeller has an optimally-designed blade shape. A multi-stage turbo compressor is also known that compresses a fluid in multiple stages, with a plurality of impellers being provided in the axial direction.

Meanwhile, in a process of compressing a refrigerant, a driving unit rotates at a high speed and generates heat. In a conventional technique for heat dissipation and cooling of the driving unit, a cooling system for circulating a separate cooling fluid through the driving unit may be provided. However, such a cooling system complicates the arrangement of the turbo compressor and requires additional cost and effort in managing the liquid-phase cooling fluid having a high pressure.

In some cases, there is a configuration designed such that a refrigerant being sucked passes through a driving unit to perform cooling and then flows into a compression unit. In this configuration, the suction refrigerant flows into the compression unit with a rising temperature, and thus the compression work is increased. That is, there is a limitation in that, although the cooling of the driving unit increases the compressor efficiency, the increase in the compression work somewhat decreases the compressor efficiency.

On the other hand, the conventional turbo compressor performs compression while the rotation of the impeller moves the refrigerant in the radial direction. To this end, a diffuser space in which a sectional area of a passage gradually increases is formed on the outer peripheral side of the impeller. In order to increase the compression ratio, the diffuser space needs to have a certain volume, which determines the size of the compressor in the radial direction. Accordingly, it is possible to contemplate a method of reducing the size of the turbo compressor or increasing the compression capacity relative to the same size, by newly designing the diffuser space.

SUMMARY

A first object of the present invention is to provide a turbo compressor in which a refrigerant passing through an impeller can be discharged while cooling a driving unit.

A second object of the present invention is to provide a turbo compressor in which a refrigerant passing through an impeller can be compressed while flowing in an axial direction of a rotary shaft.

In order to achieve the first object of the present invention, according to the present invention, there is provided a turbo compressor, comprising: a driving unit including a stator and a rotor that generate a rotational force and a rotary shaft that is connected to and rotated by the rotor; an impeller connected to the rotary shaft to pressurize a suction refrigerant in the radial direction of the rotary shaft; and a casing configured to receive the driving unit and the impeller and support the rotary shaft, wherein the casing comprises: a first shell to which the stator is fixed, the first shell rotatably supporting the rotary shaft; and a second shell spaced apart from the first shell to surround the first shell, a shell passage for the refrigerant pressurized by the impeller being defined in a space between the first and second shells.

The second shell may include: a suction port formed in a position facing the front surface of the impeller so that the refrigerant can be sucked therethrough; and a discharge port formed through the outer peripheral surface of the second shell to discharge the refrigerant passing through the shell passage.

The first shell may include: a main frame part formed at one end adjacent to the impeller to support the rotary shaft; and an opening part formed at the other end spaced apart from the main frame part in the axial direction of the rotary shaft.

The first shell may further include a first connection part projecting from the outer peripheral side of the opening part, and the second shell may include: an impeller housing part formed at one side adjacent to the impeller to surround the impeller; and a second connection part formed in a shape corresponding to the first connection part and coupled thereto at the other side spaced apart from the impeller housing part in the axial direction of the rotary shaft.

The second shell may include a sub-frame part connected to the other side to support the rotary shaft in the axial direction and the radial direction.

Each of the main frame part and the sub-frame part may include a journal bearing for surrounding the outer peripheral surface of the rotary shaft and rotatably supporting the rotary shaft, and the sub-frame part may include a thrust bearing for supporting a thrust runner projecting from the outer peripheral surface of the rotary shaft in the axial direction.

In order to achieve the second object of the present invention, according to the present invention, there is provided a turbo compressor, comprising: a driving unit including a stator and a rotor that generate a rotational force and a rotary shaft that is connected to and rotated by the rotor; an impeller connected to the rotary shaft to pressurize a suction refrigerant in the radial direction of the rotary shaft; and a casing configured to receive the driving unit and the impeller and support the rotary shaft, wherein the casing comprises: a first shell to which the stator is fixed, the first shell rotatably supporting the rotary shaft; and a second shell spaced apart from the first shell to surround the first shell, a shell passage for the refrigerant pressurized by the impeller being defined in a space between the first and second shells, the shell passage having a sectional area increased away from the impeller.

The first shell may include: an inner cylindrical part extending in the axial direction of the rotary shaft; and a diffuser part gradually recessed from the outer peripheral surface of the inner cylindrical part such that the outer diameter of the inner cylindrical part is decreased away from the impeller.

The first and second shells may be spaced apart from each other in the axial direction and extended to surround the impeller in the circumferential direction, to form a radial diffuser in the space therebetween.

The second shell may include: an outer cylindrical part extending in the axial direction of the rotary shaft; and a diffuser part gradually recessed from the inner peripheral surface of the outer cylindrical part such that the inner diameter of the outer cylindrical part is increased away from the impeller.

The sub-frame part may include: a receiving space for receiving the refrigerant passing through the journal bearing and the thrust bearing; and a return passage communicating with the receiving space and allowing the refrigerant in the receiving space to be sucked into the impeller.

According to the present invention with the approaches described above, the following effects can be obtained.

First, the turbo compressor of the present invention has the double-shell structure in which the shell passage is defined in the space between the first shell and the second shell of the casing. In turn, the refrigerant compressed by the impeller can cool the driving unit while flowing through the shell passage. Therefore, there are advantages such as simple structure and economical operation because the working fluid (refrigerant) which is to be compressed can perform cooling, without adding a separate cooling fluid and cooling driving unit. In addition, by employing the discharge refrigerant during or after the compression for cooling, it is possible to prevent the compression work from being increased due to cooling using the suction refrigerant before the compression as in the conventional art.

The first shell of the double-shell structure may include the main frame part at one side and the opening part at the other side, which simplifies the manufacturing process for fixing the driving unit to the first shell. Moreover, the first shell and the second shell may be coupled at the other side in which the opening part is positioned by means of the coupling of the inner peripheral side and the outer peripheral side thereof, which minimizes the complexity and manufacturing cost caused by the casing having the double-shell structure.

Further, the main frame part is provided in the first shell and the sub-frame part is provided in the second shell, which allows each shell to stably support the rotary shaft. Therefore, the impeller and the driving unit can perform a reliable operation.

Second, the shell passage of the turbo compressor according to the present invention is configured such that the sectional area of the passage is increased along the axial direction of the rotary shaft. To this end, the diffuser part is formed. Accordingly, the refrigerant pressurized by the impeller can be compressed while flowing along the shell passage in the axial direction of the rotary shaft. As compared with the conventional structure in which the diffuser and volute are formed adjacent to the outer peripheral surface of the impeller, the compressor can have a slim structure, which is advantageous for the decrease in size or the increase in capacity relative to the same size.

Furthermore, the refrigerant receiving space and the return passage are formed at the rear portion of the sub-frame part, and thus the refrigerant flowing through the journal and thrust bearings can smoothly flow at the center portion of the driving unit. It is thus possible to improve the supporting and cooling effects using the gas bearing.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings.

DETAILED DESCRIPTION

Hereinafter, embodiments of a turbo compressor related to the present invention will be described in detail with reference to the accompanying drawings so that they can be readily implemented by those skilled in the art.

Even in different embodiments, same or similar components to those of the previous embodiment are indicated by same or similar reference numerals, and a repeated description thereof will be omitted.

In the following description of the embodiments of the present invention, a detailed description of the related arts will be omitted in order not to unnecessarily obscure the subject matter of the embodiments disclosed herein.

Moreover, it should be noted that the accompanying drawings are given only for a better understanding of the embodiments disclosed herein and are not to be construed as limiting the technical ideas disclosed herein and are intended to include all variations, equivalents and substitutions falling within the technical ideas and scope of the present invention.

Unless clearly stated otherwise, singular forms may include plural forms.

Figure 1:
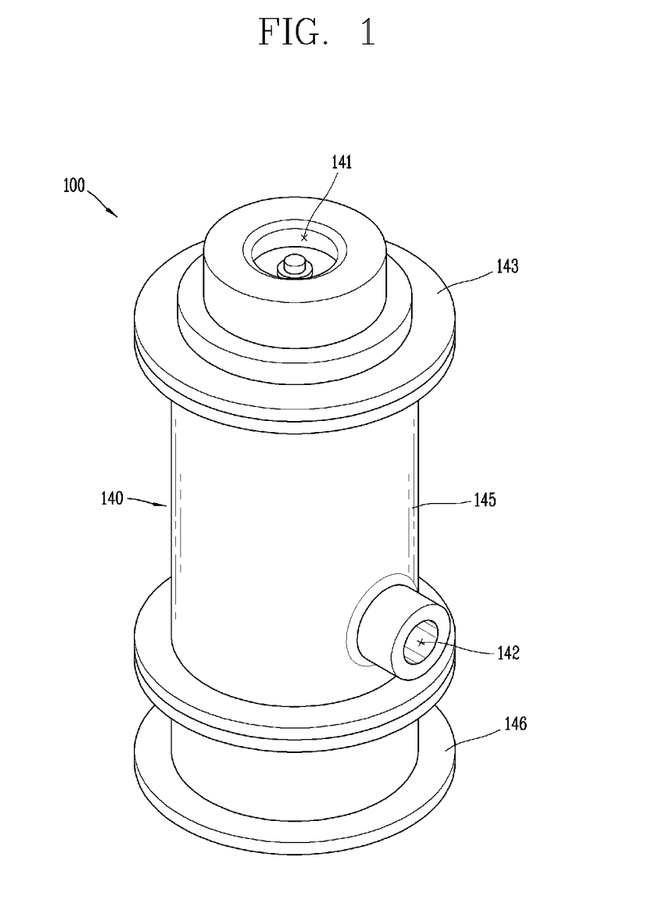
FIG. 1 is a perspective view showing a turbo compressor according to one embodiment of the present invention.
Figure 2:
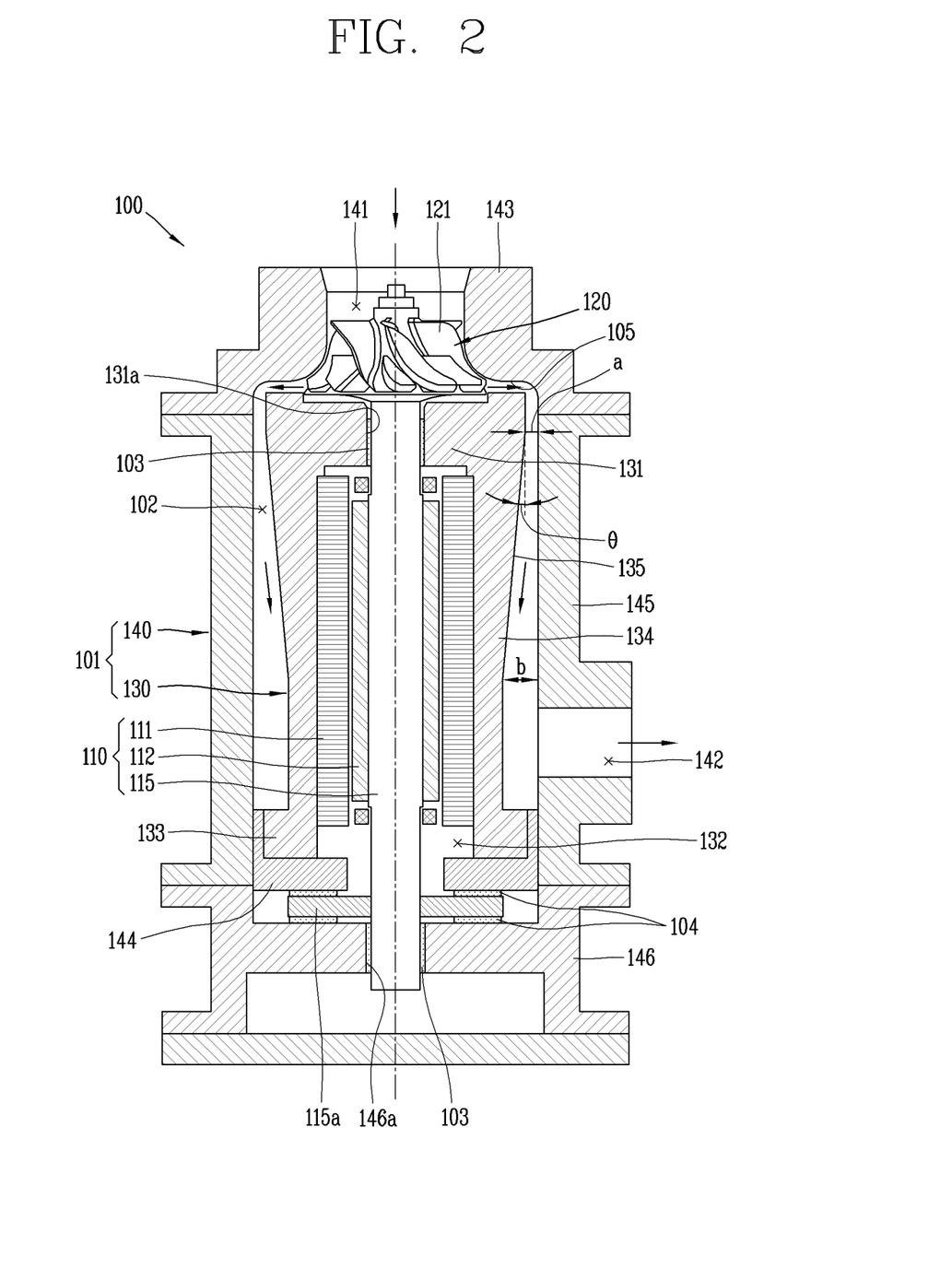
FIG. 2 is a longitudinal sectional view of the turbo compressor shown in FIG. 1.

FIG. 1 is a perspective view showing a turbo compressor 100 according to one embodiment of the present invention and FIG. 2 is a longitudinal sectional view of the turbo compressor 100 shown in FIG. 1. Referring to FIGS. 1 and 2, the turbo compressor 100 according to the present invention includes a driving unit 110, an impeller 120 and a casing 101.

The driving unit 110 is a component that generates a rotational driving force for the compression of a refrigerant. The driving unit 110 includes a stator 111 which is a static component and a rotor 112 which is received in the stator 111 and rotated by mutual operation with the stator 111. In turn, a rotary shaft 115 is coupled to the center portion of the rotating rotor 112. The driving unit 110 is supplied with electric energy and operated to generate a rotational force of the rotary shaft 115.

The impeller 120 is a component that serves to compress a refrigerant directly in contact with the refrigerant. The turbo compressor 100 as in the present invention can compress the refrigerant in a way of pushing the refrigerant introduced in the axial direction of the rotary shaft 115 to the radial direction of the rotary shaft 115 by the rotation of the impeller 120. The impeller 120 may be coupled to the rotary shaft 115 and rotated in one direction, a blade part 121 for guiding a refrigerant being formed on a front surface into which the refrigerant is introduced. In turn, on a rear surface of the impeller 120, the rotary shaft 115 may be extended and connected to the driving unit 110.

However, as shown in FIG. 2, in this embodiment, although one impeller 120 is provided for single compression, the present invention may be applied to a turbo compressor having two or more impellers for increasing a compression ratio.

Meanwhile, the casing 101 of the present invention defines a space in which the driving unit 110 and the impeller 120 are received and provides a space in which a refrigerant is sucked and compressed by the impeller 120 and then discharged. In addition, ultimately, the rotating components such as the impeller 120, the rotary shaft 115, the rotor 112 and the like can be relatively rotatably supported by the static casing 101.

In particular, in the turbo compressor 100 according to one embodiment of the present invention, the casing 101 has a double-shell structure. That is, as shown in FIG. 2, the casing 101 includes a first shell 130 and a second shell 140.

The first shell 130 is an inner shell that surrounds and supports the driving unit 110. Specifically, the first shell 130 rotatably supports the rotary shaft 115, with the stator 111 fixed to its inner surface. The first shell 130 may be generally extended in the axial direction of the rotary shaft 115 to receive the rotor 112 and the stator 111 formed along the circumference of the rotary shaft 115.

The second shell 140 is an outer shell that defines a shell passage 102, spaced apart from the first shell 130. Specifically, the second shell 140 surrounds the first shell 130, is spaced apart from the first shell 130, and defines the shell passage 102 in a space therebetween. The second shell 140 may be generally extended in the axial direction of the rotary shaft 115 to surround the first shell 130, and thus the shell passage 102 may also be extended in the axial direction of the rotary shaft 115.

Here, the shell passage 102 is formed such that the refrigerant pressurized while passing through the impeller 120 flows therethrough. To this end, the shell passage 102 may be extended from the outer peripheral side of the impeller 120. Also as shown in FIG. 2, the second shell 140 may be configured to receive the first shell 130 and the impeller 120 disposed outside the first shell 130.

In addition, the second shell 140 which is the outer shell may include a suction port 141 and a discharge port 142. The suction port 141 may be formed in a position facing the front surface of the impeller 120 so that the refrigerant can be sucked therethrough. That is, it may be formed in the front space of the impeller 120 in which the blade part 121 is formed, which is opposite to the rear space in which the driving unit 110 is connected to the impeller 120. The suction port 141 may be a cylindrical space disposed along the axial direction of the rotary shaft 114.

The compressed refrigerant is discharged through the discharge port 142. In particular, in the present invention, the discharge port 142 is positioned such that the refrigerant passing through the shell passage 102 is discharged therethrough. As shown, the discharge port 142 may be formed penetrating the outer peripheral surface of the second shell 140 and may be formed spaced apart from the suction port 141 and the impeller 120 in the axial direction of the rotary shaft 115. That is, the shell passage 102 may be positioned between an impeller housing part 143 and the discharge port 142, and thus the refrigerant pressurized by the impeller 120 may be discharged through the discharge port 142 via the shell passage 102.

The operational process of the turbo compressor 100 according to the present invention will be described based on the above-described components. First, when power is supplied to the driving unit 110 and the rotary shaft 115 is rotated, the impeller 120 starts to be rotated. With the rotation of the impeller 120, a pressure gradient toward the impeller 120 side is generated in the suction port 141 in front of the impeller 120, and thus a refrigerant is sucked through the suction pipe and the suction port 141.

The refrigerant sucked generally in the axial direction of the rotary shaft 115 flows, compressed in the radial direction of the rotary shaft 115 by the impeller 120. In turn, the refrigerant enters the shell passage 102 which is a space between the first shell 130 and the second shell 140 positioned around the impeller 120 and flows into a space between the outer peripheral surface of the first shell 130 and the inner peripheral surface of the second shell 140. Finally, the refrigerant may be discharged through the discharge port 142 provided in the second shell 140 in a compressed state.

As discussed, the turbo compressor 100 of the present invention flows through the shell passage 102 formed by the double-shell structure. While passing through the shell passage 102, the refrigerant may serve to collect heat generated in the stator 111, the rotor 112 and the rotary shaft 115 received in the first shell 130. That is, the refrigerant may cool the driving unit 110 in which generation of heat occurs.

By realizing the cooling using the discharge refrigerant, the present invention offers advantages such as simple structure and economical operation because the working fluid (refrigerant) which is to be compressed can perform cooling, without adding a separate cooling fluid and cooling driving unit.

In addition, by employing the discharge refrigerant during or after the compression for cooling, it is possible to prevent the compression work from being increased due to cooling using the suction refrigerant before the compression as in the conventional art.

Furthermore, the suction refrigerant has a lower pressure than the discharge refrigerant and thus has a relatively large volume flow rate, in which case a loss caused by a flow resistance may be significant. Since the flow loss of the suction refrigerant directly leads to the increase in the input work for rotating the impeller 120, it is more effective to use the discharge refrigerant for cooling as in the present invention.

The detailed shape and coupling relation of the casing 101 of the turbo compressor 100 according to one embodiment of the present invention that is composed of the first and second shells 130 and 140 as described above will be described below. In particular, the structure of the first and second shells 130 and 140 of the present invention will now be described in relation to the object of the present invention for simply combining them into one casing 101 structure.

First the first shell 130 may include a main frame part 131 and an opening part 132. The main frame part 131 serves to rotatably support the rotary shaft 115. As shown in FIG. 2, the main frame part 131 may be interposed between the driving unit 110 and the impeller 120 which is one end of the first shell 130.

A main axial hole 131*a* may be formed at the center portion of the main frame part 131, and the rotary shaft 115 may pass through the main axial hole 131*a*. A journal bearing 103 for rotatably supporting the rotary shaft 115 may be mounted on the inner peripheral surface of the main axial hole 131*a*, which will be described later.

The opening part 132 may be formed at the other end, which is opposite to the one end, in which the main frame part 131 is formed around the driving unit 110. The opening part 132 may be formed generally in a cylindrical shape to open the inner space of the first shell 130. The opening part 132 may allow the stator 111 to be fixedly inserted into the first shell 130 and also the rotor 112 and the rotary shaft 115 to be inserted and mounted therein.

In turn, the first shell 130 may further include a first connection part 133. The first connection part 133 is a component for connection to the second shell 140. As shown in FIG. 2, the first connection part 133 may be positioned at the other end in which the opening part 132 is formed. The first connection part 133 may project from the outer peripheral side of the opening part 132 in the radial direction of the rotary shaft 115 and extend in a ring shape along the circumference of the first shell 130.

Meanwhile, the second shell 140 may include an impeller housing part 143 and a second connection part 144. The impeller housing part 143 may be formed at one side, in which the impeller 120 is positioned, to surround the impeller 120. The impeller housing part 143 may have a space connected to the suction port 141 formed at one end of the second shell 140. The impeller housing part 143 may be formed in a shape of receiving the impeller 120 and guiding the refrigerant pressurized by the impeller 120. The second connection part 144 is a component for connection to the first connection part 133 of the first shell 130. The second connection part 144 is formed at the other side of the second shell 140, which is opposite to one side in which the impeller housing part 143 is formed. The second connection part 144 may be formed in a shape corresponding to the outer peripheral surface of the first connection part 133 and fixedly coupled to the first connection part 133.

The second connection part 144 may include a ring part coupled to the outer peripheral surface of the first connection part 133 and a flange part coupled to the end of the first connection part 133 that forms the other end of the first shell 130. By means of the ring part and the flange part of the second connection part 144, the second shell 140 can support the first shell 130 in the radial direction and the axial direction of the rotary shaft 115.

In the meantime, the second connection part 144 may be separately manufactured and then coupled to an outer cylindrical part 145 of the second shell 140. Here, the outer cylindrical part 145 indicates a cylindrical body of the second shell 140 that extends in the axial direction of the rotary shaft 115. The first shell 130 is inserted into the outer cylindrical part 145, and then the second connection part 144 is fixedly coupled to the inner peripheral surface of the outer cylindrical part 145 to be coupled to the first connection part 133 of the first shell 130, as a result of which the first shell 130 may be fixedly positioned in the second shell 140.

However, the assembly order may be changed. First, the second connection part 144 may be fixed to the outer cylindrical part 145, then the first shell 130 may be inserted and mounted into one side of the second shell 140, and then the impeller housing part 143 may be fixed to the outer cylindrical part 145.

As described above, the driving unit 110 may be inserted and mounted in the first shell 130 through the other end, and the first shell 130 may be inserted and mounted in the second shell 140 through either of the two ends. With this coupling structure, the casing 101 coupling structure of the turbo compressor 100 according to the present invention can be realized in a simple manner, which minimizes the manufacturing cost. Even in the conventional single shell structure, a casing surrounding the impeller 120 and a casing surrounding the driving unit have a separated structure, and also the opposite end of the impeller 120 has a separated casing structure. Compared with the conventional single shell structure, the double shell structure according to the present invention does not increase complexity in terms of the assembly.

The turbo compressor 100 according to the present invention includes a bearing structure for supporting the rotary shaft 115 in the radial direction and the axial direction. The turbo compressor 100 of this embodiment has a bearing structure evenly distributed to the first shell 130 and the second shell 140.

As discussed, the first shell 130 may include the main frame part 131 and the main frame part 131 may include the journal bearing 103 mounted in the main axial hole 131*a*. Along with this, the second shell 140 may include a sub-frame part 146.

The sub-frame part 146 may be coupled to the other side of the second shell 140 to which the second connection part 144 is coupled. The sub-frame part 146 may support the rotary shaft 115 in the axial direction and the radial direction. Similarly to the journal bearing 103 of the main frame part 131, the sub-frame part 146 may include a sub-axial hole 146*a* through which the rotary shaft 115 passes. The journal bearing 103 supporting the rotary shaft 115 in the radial direction may be mounted on the inner peripheral surface of the sub-axial hole 146*a*.

In addition, the sub-frame part 146 may include a thrust bearing 104. The thrust bearing 104 is a component for restricting displacement by a thrust generated by a refrigerant pressure difference between the front and rear spaces of the impeller 120 during the operation of the turbo compressor 100 according to the present invention.

In order to restrict displacement of the rotary shaft 115, a thrust runner 115*a* may be fixedly coupled to the rotary shaft 115. As shown in FIG. 2, the thrust runner 115*a* may be a disc-shaped member that projects from the outer peripheral surface of the rotary shaft 115 in the radial direction.

The thrust bearing 104 may be configured such that the thrust runner 115*a* can be supported while rotating in a friction manner. In this embodiment, the thrust bearing 104 may be formed at each of the sub-frame part 146 and the second connection part 144 to support the thrust runner 115*a* on both front and rear surfaces. The thrust bearing 104 makes it possible to restrict displacement by the thrust generated in the axial direction of the rotary shaft 115 (for example, in a direction from the lower side to the upper side of FIG. 2) in the impeller 120 of this embodiment.

Meanwhile, the turbo compressor 100 according to this embodiment may employ a gas bearing as shown to realize high-speed rotation. Unlike the ball bearing, the gas bearing has advantages in that it can support high loads with a large lubrication surface formed by a refrigerant or oil and can be easily replaced. Also, the gas bearing can realize high-speed rotation, as compared with the ball bearing.

Specifically, each of the journal bearing 103 and the thrust bearing 104 may include a bump foil and a top foil. In the high-speed rotation of the rotary shaft 115 or the thrust runner 115a, the bump foil is elastically pressed to form an air layer between the top foil and the rotary shaft 115, such that the rotary shaft 115 can be supported by the air layer during the operation.

As described above, the journal bearing 103 may be distributed to each of the main frame part 131 of the first shell 130 and the sub-frame part 146 of the second shell 140. In turn, the thrust bearing 104 may be installed between the second connection part 144 and the sub-frame part 146 of the second shell 140. This structure makes it possible to stably support the rotary shaft 115 by each of the shells and to secure operational reliability of the impeller 120.

The characteristics of the present invention, in which the casing 101 structure includes the first shell 130 and the second shell 140 and the compressed refrigerant flows through the space therebetween to cool the driving unit 110, have been explained earlier. Hereinafter, the configuration of the present invention, in which the refrigerant can be compressed while passing through the shell passage 102, will be described as another object of the present invention.

Referring to FIG. 2, in the turbo compressor 100 according to one embodiment of the present invention, the shell passage 102 may be configured such that the sectional area of the passage is increased away from the impeller 120. That is, the shell passage 102 may be configured such that the sectional area of the passage increases from one side to the other side of the first and second shells 130 and 140, extending in the axial direction of the rotary shaft 115. This configuration serves as a diffuser for compressing the refrigerant passing through the shell passage 102.

Specifically, the first shell 130 of the casing 101 may include an inner cylindrical part 134 and a diffuser part 135. The inner cylindrical part 134 is a component that forms a basic structure of the first shell 130, while the diffuser part 135 is a component that serves as a diffuser as described above.

The inner cylindrical part 134 is formed in a cylindrical shape extending in the axial direction of the rotary shaft 115 to receive the driving unit 110. The stator 111 may be fixed to the inner peripheral surface of the inner cylindrical part 134, and the rotor 112 and the rotary shaft 115 may be received on the inner peripheral side of the stator 111. As discussed, the main frame part 131 may be formed at one end of the inner cylindrical part 134, and the opening part 132 and the first connection part 133 may be formed at the other end.

The diffuser part 135 may be recessed from the outer peripheral surface of the inner cylindrical part 134. In particular, it may be gradually recessed such that the overall outer diameter of the inner cylindrical part 134 is decreased away from the impeller 120. That is, the diffuser part 135 may form a gradient at a certain angle while extending in the axial direction of the rotary shaft 115.

The slope relative to the axial direction of the rotary shaft 115 and the ratio of the changes in the sectional area of the passage by the diffuser part 135 may be designed in consideration of a desired compression ratio of a refrigerant. For example, the slope θ relative to the axial direction of the rotary shaft 115 in FIG. 2 serves to increase the sectional area of the shell passage 102 at an angle of 10° to 15°. In addition, the expansion ratio of the sectional area of the passage that is formed by a radial width (a) of the shell passage 102 at the front end of the diffuser part 135 and a radial width (b) of the shell passage 102 at the rear end of the diffuser part 135 may range approximately from 1.5 to 2. As the diffuser part 135 is formed with this slope or ratio, the refrigerant can be sufficiently compressed while flowing in the axial direction of the rotary shaft 115.

Forming the diffuser part 135 allows the refrigerant pressurized in the radial direction of the rotary shaft 115 by the impeller 120 to be compressed while flowing along the shell passage 102 in the axial direction of the rotary shaft 115. With the casing 101 structure of the present invention, as compared with the conventional structure in which the diffuser and volute are formed adjacent to the outer peripheral surface of the impeller, the turbo compressor 100 of the present invention can have a slim structure.

Specifically, the conventional diffuser and volute are formed in a shape, on one hand, extending in the radial direction on the outer peripheral side of the impeller, and on the other hand, extending in the axial direction to which the driving unit is connected. As a result, the radial and axial sizes of the compressor should be increased to increase the capacity of the compressor, and thus the space is not easy to use.

On the contrary, the turbo compressor 100 according to the present invention may be designed such that the driving unit 100 and the diffuser are enlarged in the axial direction of the rotary shaft 115 for the increase in size. Accordingly, it is easy to increase the capacity of the compressor by maximally utilizing the installation space for the compressor. In another perspective, the turbo compressor 100 of the present invention occupies a slimmer space than the conventional compressor, relative to the same capacity, which is advantageous for the decrease in size of the compressor.

In addition, the diffuser structure of the turbo compressor 100 according to the present invention is not necessarily configured such that a refrigerant is compressed only in one direction, i.e., in the axial direction of the rotary shaft 115. As shown in FIG. 2, the first and second shells 130 and 140 may be configured to form a radial diffuser 105.

The radial diffuser 105 may be formed on the inlet side surrounding the impeller 120 in the circumferential direction, in the shell passage 102 that is a space between the first shell 130 and the second shell 140. Specifically, the space extending in the radial direction of the rotary shaft 115 along the main frame part 131 of the first shell 130 at the outer periphery of the impeller 120 could be the radial diffuser 105.

The radial diffuser 105 space needs not to be formed to increase the distance between the first shell 130 and the second shell 140, because the sectional area of the passage increases due to the increase in radius while the refrigerant flows in the radial direction of the rotary shaft 115. However, in order to attain a higher compression ratio, the radial diffuser may be designed such that the distance between the first shell 130 and the second shell 140 is increased in the radial direction of the rotary shaft 115.

As shown in FIG. 2, in one embodiment of the present invention, the refrigerant may be pressurized and primarily compressed by the impeller 120 while passing through the radial diffuser 105, and then continuously compressed while passing through the diffuser part 135 extending in the axial direction of the rotary shaft 115. This structure makes it possible to maximize the compression efficiency of the refrigerant without enlarging the diffuser in the radial direction.

Figure 3:
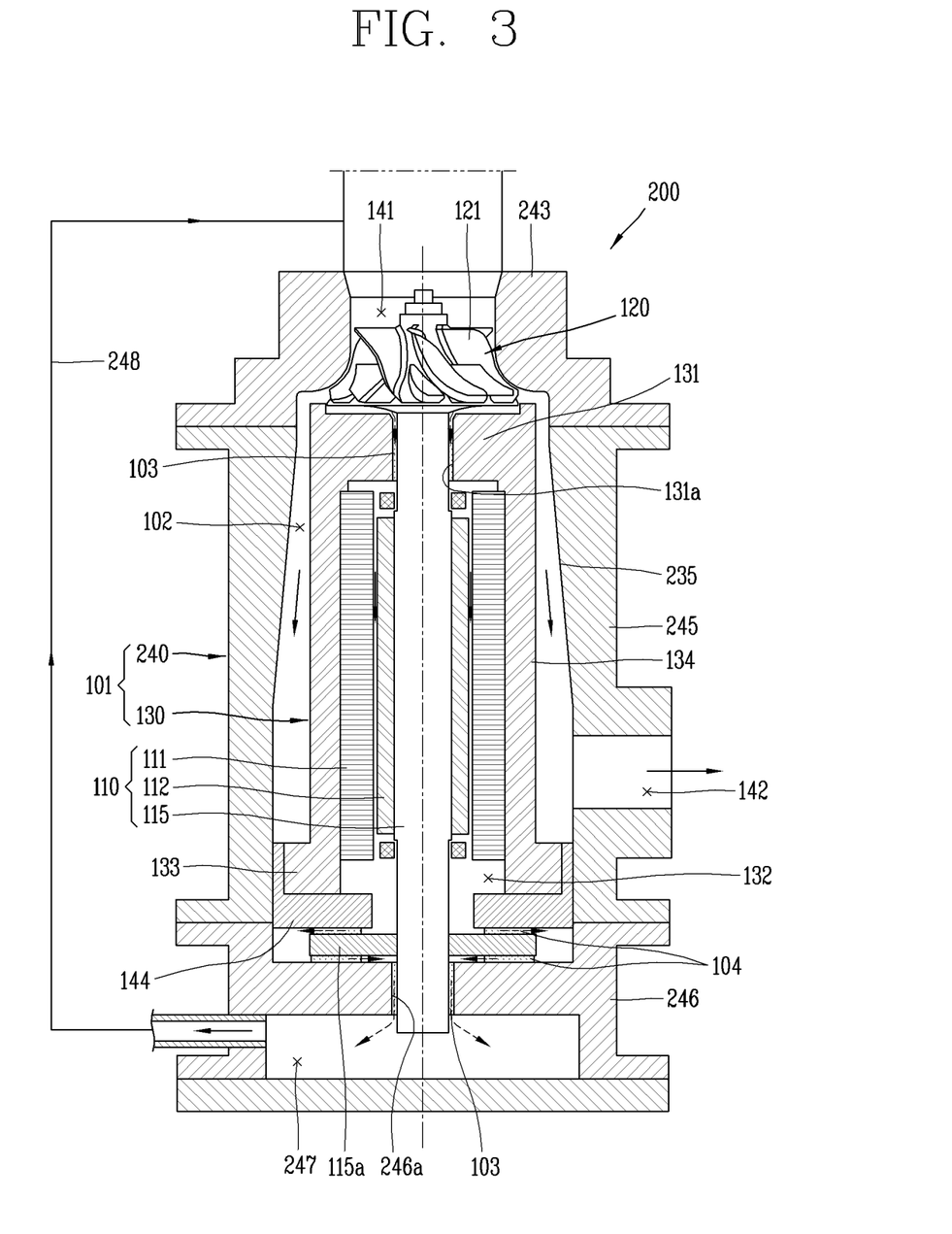
FIG. 3 is a longitudinal sectional view showing a turbo compressor according to another embodiment of the present invention.

In the meantime, FIG. 3 is a longitudinal sectional view showing a turbo compressor 200 according to another embodiment of the present invention. In this embodiment, unlike the foregoing embodiment, a diffuser part 235 may be formed on the side of a second shell 240.

Referring to FIG. 3, the second shell 240 of the casing 101 of the present invention may include an outer cylindrical part 245 and a diffuser part 235. The outer cylindrical part 245 may be a cylindrical part that extends in the axial direction of the rotary shaft 115 and receives the first shell 130 therein. An impeller housing part 243 may be formed at one end of the outer cylindrical part 245, and a second connection part 144 and a sub-frame part 246 may be coupled to the other end thereof.

The diffuser part 235 of this embodiment may be gradually recessed from the inner peripheral surface of the outer cylindrical part 245. That is, the diffuser part 235 may form a slope on the inner peripheral surface such that the inner diameter of the outer cylindrical part 245 is increased away from the impeller 120 in the axial direction of the rotary shaft 115. As previously explained in the above embodiment, the slope or the ratio of the changes in the width of the shell passage 102 may be designed in consideration of the compression ratio of the refrigerant.

As in this embodiment, when the diffuser part 235 is formed on the inner peripheral surface of the second shell 240, the thickness of the first shell 130 needs not to be increased in consideration of the changes in the slope, and thus can be smaller than that of the above embodiment. As the refrigerant cools the driving unit 110 inside the first shell 130 while flowing through the shell passage 102, the cooling efficiency of the driving unit 110 can be more improved in the present embodiment in which the thickness of the first shell 130 is decreased.

Further, referring to FIG. 3, this embodiment has a structure for circulating a refrigerant in the first shell 130. To this end, the sub-frame part 246 coupled to the other end of the second shell 240 includes a receiving space 247 and a return passage 248.

As in the embodiment described above, the sub-frame part 246 is coupled to the other end of the second shell 240. In turn, the sub-frame part 246 may include the thrust bearing 104 for supporting the thrust runner 115a fixed to the rotary shaft 115, together with the second connection part 144 of the second shell 240. Moreover, a journal bearing 103 with a sub-axial hole 246a for supporting the rotary shaft 115 in the radial direction may be mounted on the sub-frame part 246.

In the present invention, the thrust bearing 104 and the journal bearing 103 may be gas bearings that form lubrication surfaces with a refrigerant and oil, as described above. Therefore, during the operation of the turbo compressor 100 according to the present invention, the refrigerant may flow through the lubrication surfaces from the rear surface of the impeller 120.

In this embodiment, the receiving space 247 may be an inner space of the sub-frame part 246 in which the refrigerant passing through the lubrication surfaces of the journal bearing 103 and the thrust bearing 104 are collected. Also, as shown in FIG. 3, the return passage 248 may be formed to allow the receiving space 247 and the suction port (141; or suction pipe) to communicate with each other. Accordingly, the refrigerant flowing into the receiving space 247 may flow into the suction port 141 side through the return passage 248 and then be sucked into the impeller 120.

Adding the receiving space 247 and the return passage 248 allows the refrigerant to be circulated through the lubrication spaces in the first shell 130. That is, the refrigerant may pass through the journal bearing 103 surface of the main frame part 131, pass through the gap between the stator 111 and the rotor 112, and then pass through the thrust bearing 104 and the journal bearing 103 of the sub-frame part 246. The refrigerant reaching the receiving space 247 may be collected at the suction port 141 side along the return passage 238. Consequently, the refrigerant can support the gas bearing surfaces while more directly cooling the lubrication surfaces and the driving unit 110 at the same time. The improvement of the cooling effect can contribute to the improvement of the efficiency of the turbo compressor 100 of the present invention.

Figure 4:
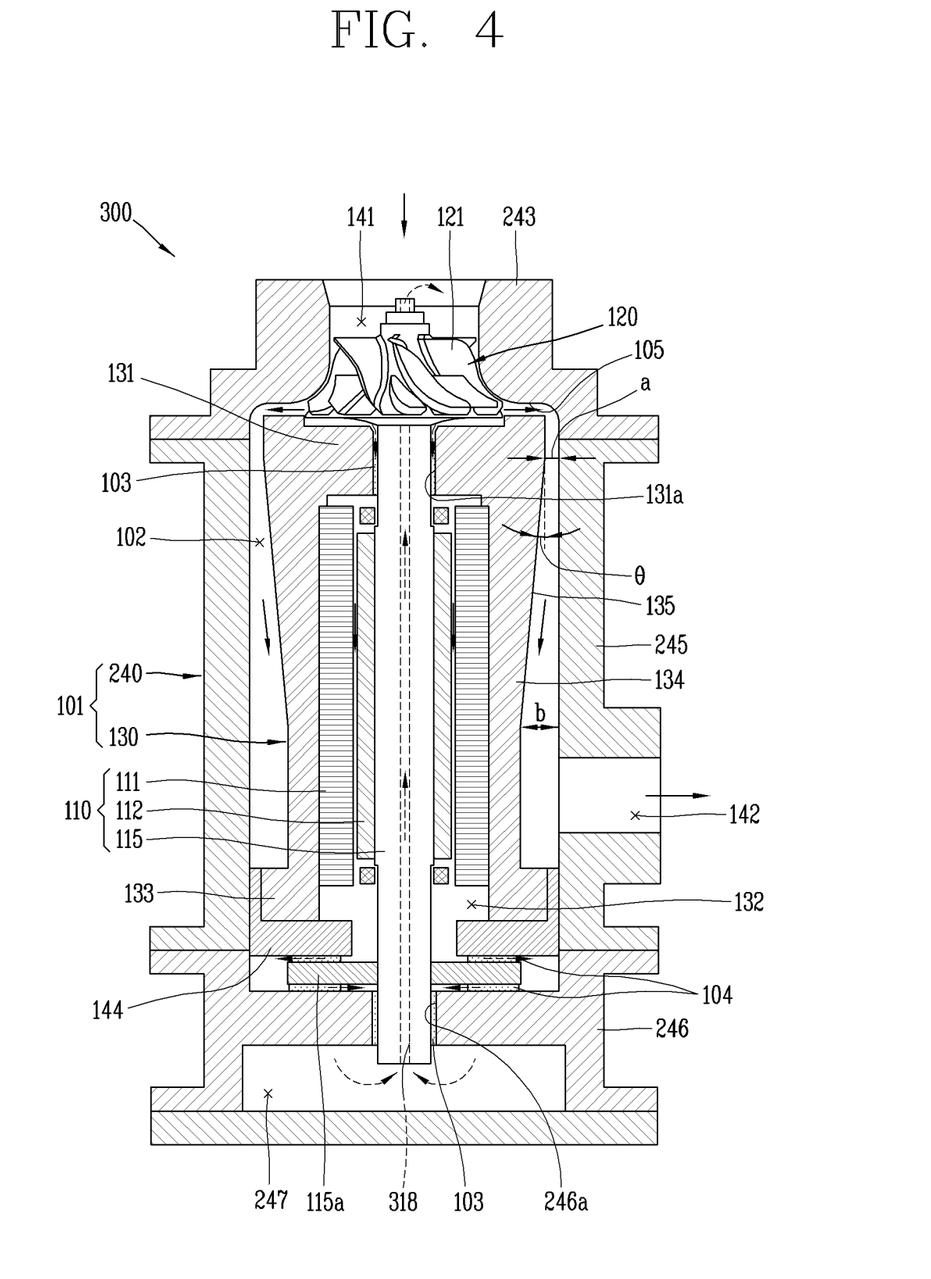
FIG. 4 is a longitudinal sectional view showing a turbo compressor according to a further embodiment of the present invention.

Meanwhile, FIG. 4 is a longitudinal sectional view showing a turbo compressor 300 according to a further embodiment of the present invention. The further embodiment of the present invention of FIG. 4 shows a return passage 318 that passes through the rotary shaft 115 unlike the above embodiment.

As shown, the return passage 318 may be formed to penetrate the rotary shaft 115 to return the refrigerant in the receiving space 247 to the suction port 141 side. Additional machining for penetrating the rotary shaft 115 is required, but a material and process for forming the return passage 318 on the outside as in the above embodiment can be eliminated. Moreover, in this embodiment, the refrigerant can cool the rotary shaft 115 and the inner components one more time while flowing through the rotary shaft 115.

Although the embodiments of the turbo compressor according to the present invention have been described, the present invention is not limited thereto. It will be understood by those of ordinary skill in the art that various changes and modifications may be made without departing from the scope of the present invention as defined in the following claims.

What is claimed is:

1. A turbo compressor, comprising:
a driving unit configured to generate rotational force, the driving unit including a stator, a rotor, and a rotary shaft that is connected to the rotor, that is configured to rotate based on rotation of the rotor, and that extends in an axial direction;
an impeller connected to the rotary shaft and configured to pressurize refrigerant in a radial direction of the rotary shaft; and
a casing that receives the driving unit and the impeller and that supports the rotary shaft,
wherein the casing comprises:
a first shell coupled to the stator and configured to rotatably support the rotary shaft, and
a second shell that is spaced apart from the first shell and that surrounds the first shell,
wherein the first shell and the second shell define a shell passage in a space between the first and second shells, the shell passage being configured to guide refrigerant pressurized by the impeller,
wherein the first shell comprises:
a main frame part that is located at a first end of the first shell adjacent to the impeller and that supports the rotary shaft, an opening part that is defined at a second end of the first shell and that is spaced apart from the main frame part in the axial direction of the rotary shaft, and a first connection part that protrudes radially outward from the opening part, wherein the second shell comprises:

an impeller housing part that is located at a first side of the second shell adjacent to the impeller and that surrounds the impeller, and a second connection part that is located at a second side of the second shell, that is coupled to the first connection part, and that has a shape corresponding to a shape of the first connection part, the second connection part being spaced apart from the impeller housing part in the axial direction of the rotary shaft, wherein the second connection part contacts an outer peripheral surface of the first connection part and an inner peripheral surface of the second shell, wherein a portion of the second connection part extends further toward the rotary shaft than an inner peripheral surface of the first shell, and wherein the first and second connection parts block a portion of the shell passage.

2. The turbo compressor of claim 1, wherein the second shell comprises:

a suction port that is defined at a position facing a surface of the impeller and that is configured to receive refrigerant; and a discharge port that penetrates an outer peripheral surface of the second shell and that is configured to discharge refrigerant that has passed through the shell passage.

3. The turbo compressor of claim 2, wherein a sectional area of the shell passage increases in a direction extending from the impeller toward the discharge port.

4. The turbo compressor of claim 1, further comprising a sub-frame part that is connected to the second side of the second shell and that supports the rotary shaft in the axial direction and in the radial direction.

5. The turbo compressor of claim 4, wherein each of the main frame part and the sub-frame part comprises a journal bearing that surrounds an outer peripheral surface of the rotary shaft and that rotatably supports the rotary shaft, wherein the rotary shaft comprises a thrust runner that projects radially outward from the outer peripheral surface of the rotary shaft, and wherein the sub-frame part comprises a thrust bearing that supports the thrust runner in the axial direction.

6. The turbo compressor of claim 5, wherein the sub-frame part comprises:

a receiving space configured to receive refrigerant that has passed through the journal bearing and the thrust bearing; and a return passage that communicates with the receiving space, that allows the impeller to suction refrigerant from the receiving space, and that is configured to provide the refrigerant from the receiving space to a suction port of the impeller housing that is disposed at an outer side of the casing.

7. The turbo compressor of claim 5, wherein the sub-frame part comprises:

a receiving space configured to receive refrigerant that has passed through the journal bearing and the thrust bearing; and a return passage that communicates with the receiving space and that allows the impeller to suction refrigerant from the receiving space, and wherein the return passage penetrates the rotary shaft in the axial direction of the rotary shaft, and connects between the receiving space and a suction port of the impeller housing.

8. The turbo compressor of claim 1, wherein a sectional area of the shell passage increases along a direction extending away from the impeller.

9. The turbo compressor of claim 8, wherein an outer peripheral surface of the first shell slopes with respect to an inner peripheral surface of the second shell, and wherein the sectional area of the shell passage gradually increases along the direction extending away from the impeller.

10. The turbo compressor of claim 1, wherein the first shell further comprises:

an inner cylindrical part that extends in the axial direction of the rotary shaft; and a diffuser part recessed from an outer peripheral surface of the inner cylindrical part, and wherein an outer diameter of the inner cylindrical part decreases in a direction extending away from the impeller.

11. The turbo compressor of claim 10, wherein the first and second shells are spaced apart from each other in the axial direction to define a radial diffuser in a space between the first and second shells, the first and second shells surrounding the impeller in a circumferential direction of the impeller.

12. The turbo compressor of claim 11, wherein the radial diffuser is connected to the shell passage, and is configured to guide refrigerant pressurized by the impeller to the shell passage in the radial direction of the rotary shaft.

13. The turbo compressor of claim 11, wherein a sectional area of the radial diffuser is less than a sectional area of the shell passage.

14. The turbo compressor of claim 1, wherein the second shell further comprises:

an outer cylindrical part that extends in the axial direction of the rotary shaft; and a diffuser part recessed from an inner peripheral surface of the outer cylindrical part, and wherein an inner diameter of the outer cylindrical part increases in a direction extending away from the impeller.

15. The turbo compressor of claim 1, wherein a sectional area of the shell passage varies along the axial direction of the rotary shaft.

16. The turbo compressor of claim 1, wherein the rotary shaft passes through the rotor in the axial direction of the rotary shaft.

17. The turbo compressor of claim 1, wherein a length of the first shell is less than a length of the rotary shaft in the axial direction of the rotary shaft.

18. The turbo compressor of claim 1, wherein the rotary shaft passes through the rotor in the axial direction, the stator surrounds the rotor, and the first shell surrounds the stator.

* * * * *